April 17, 1945.　　　F. E. JOHNSON　　　2,373,833
CABLE CLAMP
Filed Aug. 24, 1943
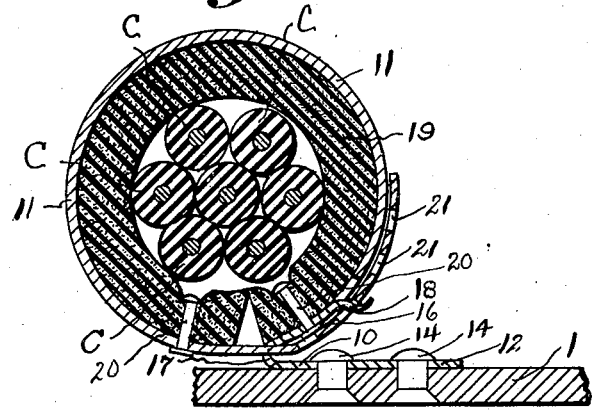
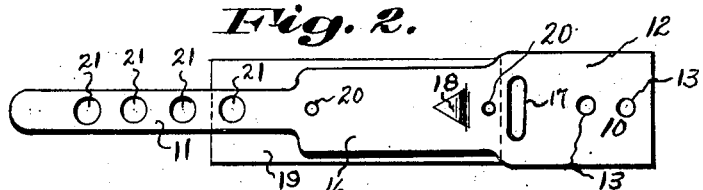
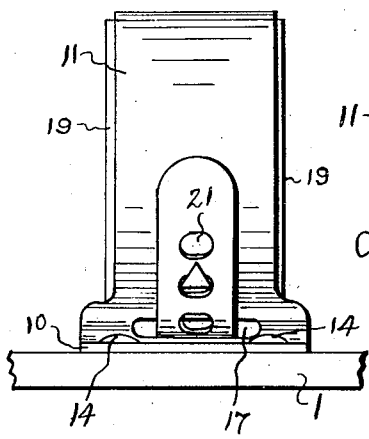 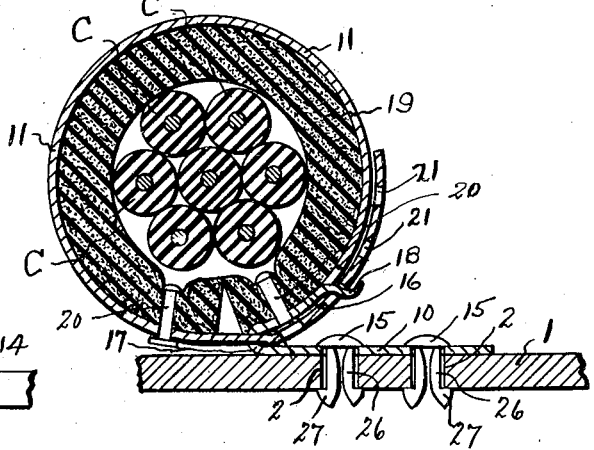
Inventor
Frank E. Johnson.
By Walter S. Jones
Attorney Patented Apr. 17, 1945

2,373,833

UNITED STATES PATENT OFFICE 2,373,833

CABLE CLAMP

Frank E. Johnson, Malden, Mass., assignor to United-Carr Fastener Corporation, Cambridge, Mass., a corporation of Massachusetts Application August 24, 1943, Serial No. 499,858

2 Claims. (Cl. 248—74)

The present invention relates to cable clamps for clamping a plurality of electrical cables together in gripping relation and aims generally to simplify and improve existing clamps for this purpose.

One of the primary objects of the invention is to provide a clamp that can be readily adjusted to accommodate groups of cables of various sizes.

A further object of the invention is to provide a cable clamp made from a single strip of sheet metal which may be provided with a sponge rubber, or the like, lining secured to the same to prevent chafing of the insulation on electrical cables, the clamp being of such construction that it may be readily adjusted to various sized loops according to the size and number of the cables to be clamped.

A further object of the invention is the provision of an adjustable cable clamp of extremely simple construction which may be formed from a single strip of metal at a very low cost and which may be quickly and easily attached to a supporting part by snap fastener means, thus reducing the cost of the construction as well as the assembly of the installation.

Other objects and advantages of the invention will be apparent from an inspection of the accompanying and annexed specification illustrating and describing preferred embodiments of the invention.

In the drawing:

Fig. 1 is an enlarged side elevation of my improved cable clamp;

Fig. 2 is a plan view of the fabricated blank from which the clamp is made and before it is bent to shape (the liner being riveted in place);

Fig. 3 is a front elevation of the clamp; and

Fig. 4 is an enlarged transverse sectional view thereof illustrating a modified form of attaching the clamp to a support.

Referring to the drawing, my improved cable clamp is adapted to be secured to a suitable supporting surface, preferably an apertured support, which may be a part of the framework 1 of an aircraft, motor vehicle, ship, building or like structure and along which it is desired to run a plurality of electrical conductors and clamp them together in grouped relationship at selected points.

In the illustrated embodiment of the invention the improved clamp of the present invention is formed from a single strip of material, as for example sheet metal, having a relatively wide and stiff base portion 10 at one end thereof and a relatively flexible elongated band 11 at the other end thereof. The base portion 10 preferably comprises an attaching portion 12 formed with a plurality of apertures 13 for the reception of securing means which may be in the form of rivets 14 (Fig. 1) or the snap fastener securing means 15 (see Fig. 4). The clamp also includes a portion 16 disposed angularly to the attaching portion, which portion is provided with a transverse slot 17 adjacent the attaching portion and a projection 18 beyond the slot 17. The portion 16 beyond the slot 17 constitutes a part of the band.

The band portion 11 of the clamp extends from the base beyond the slot 17 and preferably has attached thereto a strip of flexible insulating material 19 and preferably this insulating material is a highly yieldable material, for example sponge rubber. Preferably the strip of sponge rubber may be secured to the band and adjacent portion 16 of the base by suitable means, as for example rivets 20 or the like.

The terminal end portion of the band 11 beyond the insulating strip 19 is preferably provided with a plurality of apertures 21 or other means for selective engagement with the projection 18 as will be apparent.

The band 11 and its associated insulating strip is adapted to be bent to form an enclosed loop, as illustrated in Figs. 1 and 4, the terminal end being passed through the aperture 17 and underlying the adjacent portion 16 of the clamp. A group of insulated cables or conductors C may be positioned within the enclosed loop and engaged by the inner face of the insulating strip. When the loop is sufficiently constricted by progressively forcing the band through the aperture 17 so as to grip the assemblage of cables, the terminal end may be secured against expansion by seating the projection 18 of the base selectively in one of the apertures 21 in the terminal end of the band.

Instead of riveting or otherwise securely fastening the base of the clamp to the support, the clamp may be effectively attached to the support by merely passing suitable snap fasteners 15 through openings 13 of the base which are aligned with openings 2 of the support 1, as shown in Fig. 4. These fasteners may be of any suitable construction but preferably have a button-like head, a resilient split shank 26 and shouldered portions 27. Any convenient form of fastener suitable for the purpose may be used.

It will be apparent from the foregoing that the improved cable clamp of the present invention is extremely simple in construction, cheap in cost of manufacture and may be readily mounted and assembled in the installation in a minimum of time and with a minimum of effort, thus materially reducing the cost of and time required for completion of the installation.

Although I have illustrated and described preferred forms of my invention, I do not wish to be limited thereby because the scope of my invention is best defined by the following claims.

I claim:

1. A cable clamp for clamping a plurality of cables in grouped assembly comprising an elongated strip of metal having a relatively stiff base including a portion adapted to be secured to a support and an angularly disposed portion formed with an elongated slot therein, a relatively flexible band extending from the angularly disposed portion of said base and capable of being bent to form an enclosed loop with the terminal end portion of said band passed through said slot, a projection on said clamp beyond said slot, and a plurality of apertures in said band for selective locking engagement with said projection whereby the size of said loop may be varied.

2. A cable clamp for clamping a plurality of cables in grouped assembly comprising an elongated strip of metal having a relatively stiff base including an apertured attaching portion adapted to be secured to an apertured support, said base also having a portion angularly disposed to said attaching portion formed with an elongated slot therein, a relatively flexible band extending angularly from the angularly disposed slotted portion of said base and bendable to form an enclosed loop, the terminal end portion of said band being passed through the slot of said base portion and means for adjustably connecting the end portion of said band to the portion of said clamp beyond said slot.

FRANK E. JOHNSON.